June 30, 1970 — D. W. WENDT — 3,517,764
MOTORBIKE
Filed Nov. 12, 1968 — 3 Sheets-Sheet 1
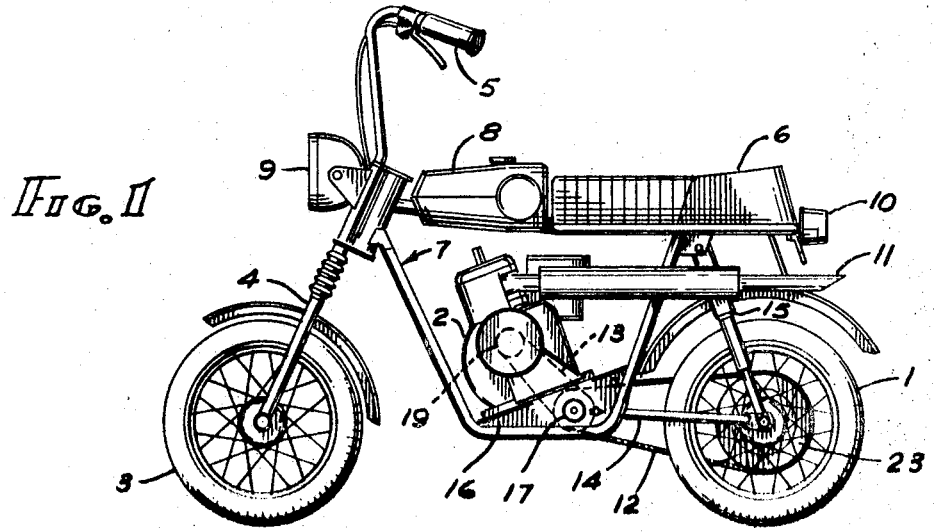
Fig. 1
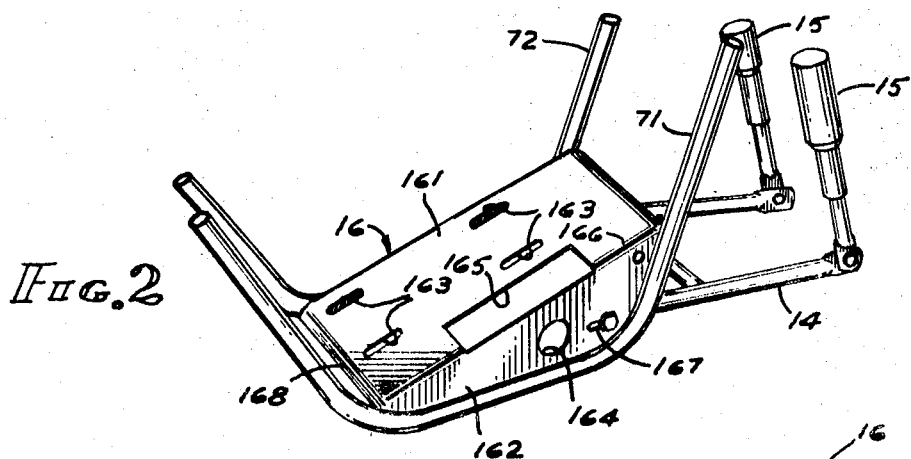
Fig. 2
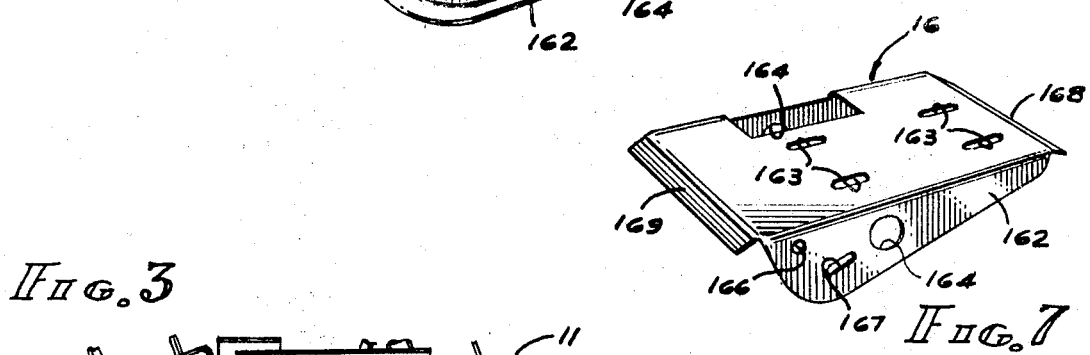
Fig. 3
Fig. 7
INVENTOR.
DAVID W. WENDT
BY Howard M. Herriot
ATTY.

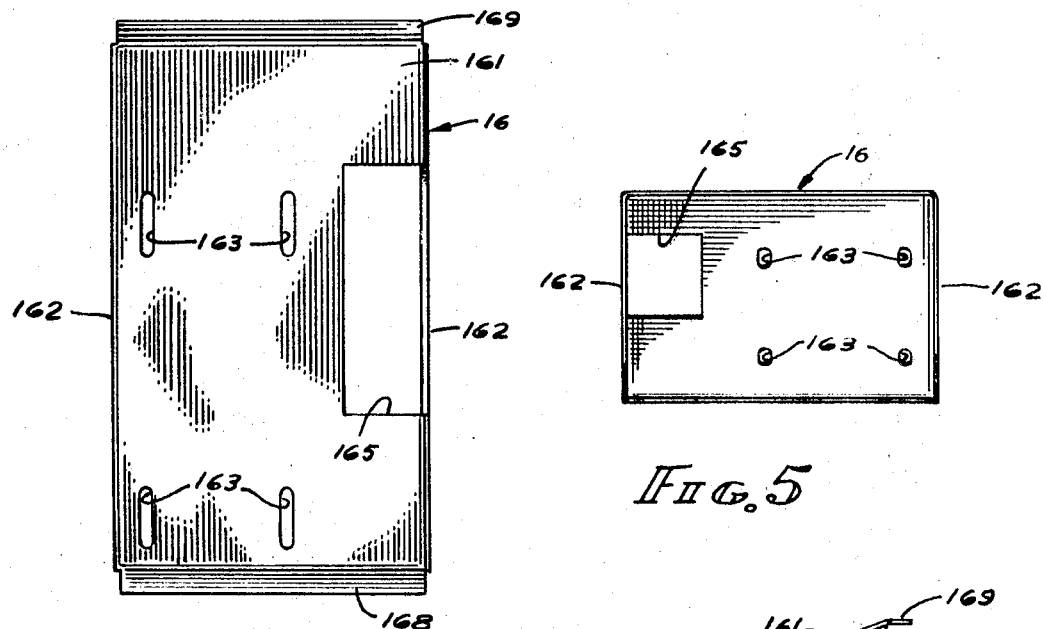
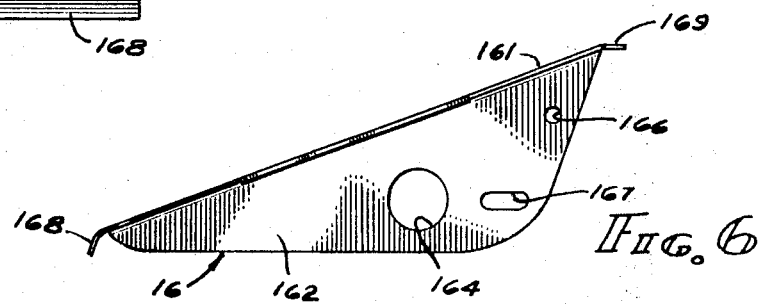
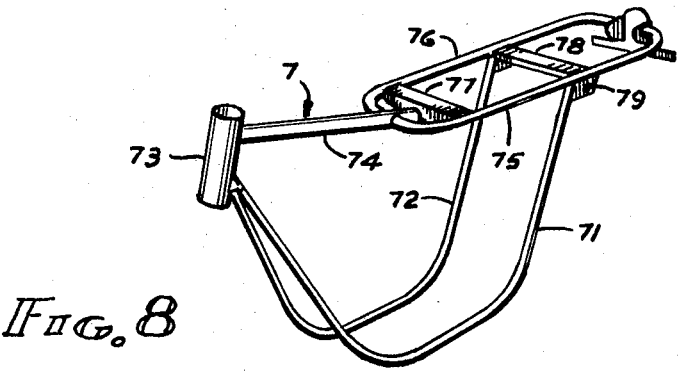

June 30, 1970  D. W. WENDT  3,517,764
MOTORBIKE

Filed Nov. 12, 1968  3 Sheets-Sheet 3

INVENTOR.
DAVID W. WENDT
BY
Howard M Herriot
ATTY.

tion 3,517,764
Patented June 30, 1970

3,517,764
MOTORBIKE
David W. Wendt, Janesville, Wis., assignor, by mesne assignments, to Fox Corporation, Janesville, Wis., a corporation of Wisconsin
Filed Nov. 12, 1968, Ser. No. 774,857
Int. Cl. B62d 61/02
U.S. Cl. 180—33
10 Claims

ABSTRACT OF THE DISCLOSURE

A motorbike, operable with either direct chain drive or jackshaft chain drive, includes a one-piece engine mount fixed on the bike frame and inclined from horizontal about twenty degrees to thereby tilt the engine forwardly, permitting a low, compact bike frame design and use of a conventional industrial engine. The mount is slotted for adjusting the engine thereon to obtain chain adjustment. The mount is bored to provide bearing support for the jackshaft. An opening in the mount passes a chain therethrough. The mount has slots and holes therein for connecting a swing arm H-frame thereto, the slots providing a second chain adjustment with a jackshaft drive. The H-frame is reversible for use with either direct drive or jackshaft drive. Rear shock absorbers connect the upper portion of the bike frame to the rear wheel axle.

This invention relates to a motorbike adapted to be driven by chain and sprocket means selectively through either: a direct chain drive from the engine sprocket to a driving wheel sprocket on one side of the driving wheel; or a jackshaft drive including an engine-to-jackshaft chain from the engine sprocket to a first of jackshaft sprocket on one end of the jackshaft and a jackshaft-to-driving wheel chain from a second jackshaft sprocket on the other end of the jackshaft to a driving wheel sprocket on the other side of the driving wheel. More particularly, this invention relates to an engine mount arrangement for such a motorbike which is very simple, highly effective and significantly advantageous.

This invention provides a motorbike and engine mount with the engine of the bike tilted forwardly to obtain a low compact overall bike frame construction, and does so utilizing a conventional industrial type engine such as those used for lawn mowers, garden tractors, snow blowers, and motor-generator sets.

The invention also permits use of a longer swing arm H-frame than is conventional, and thus provides a smoother ride, because of the longer radius of the arc of movement of the driving wheel axle.

The invention further provides motorbike chain adjustment, not at the rear wheel location as is conventional, but rather at the engine mount at the forward end of the H-frame, which is highly advantageous when caliper spot disc brakes are used, because the chain can be adjusted or readjusted without changing the brake adjustment.

The invention provides an engine mount mounting platform with a chain opening therethrough, and the chain from the engine runs through that opening. The platform acts as a guard providing safety through protection from that part of the chain which is in close proximity to the operator's foot.

The invention provides support at the engine mount for the forward end of the swing arm H-frame in either of the two drive arrangements, jackshaft or direct, and the same swing arm H-frame can be used in either arrangement by merely flipping it side-for-side when changing from one drive arrangement to the other to thereby reverse the entire assembly of driving wheel, drive wheel sprocket, swing arm H-frame and associated parts.

The invention provides a one-piece engine mount which serves as the support for: the forward end of the swing arm H-frame; the engine; and the jackshaft. This is an improvement over the conventional construction utilizing three parts to provide that support; the simplified engine mount of this invention being less costly to manufacture than the prior constructions.

The invention provides improved alignment of the drive components during assembly operations in the factory because more of the associated drive components are mounted to one piece, the engine mount, as compared to prior constructions, through providing holes, slots and other mounting openings in a one-piece structure for assuring consistent and economic assembly.

The invention provides for mounting rear spring shock absorbers directly on to the rear axle. This reduces the number of parts required and lowers the cost, as compared to the prior constructions in which separate parts, such as plates, are used to connect the rear shock absorber or the rear shock absorber and axle to the swing arm H-frame.

The invention provides a new and desirable appearance for a motorbike as well as new and desirable functional features.

The invention and the objects, advantages, and results thereof can be further appreciated by reference to the following detailed description of a preferred embodiment thereof taken in connection with the accompanying drawings wherein:

FIG. 1 is a side elevational view of a motorbike embodying the invention, the bike being connected in jackshaft drive arrangement;

FIG. 2 is a perspective view of a portion of said motorbike;

FIG. 3 is a side elevation view of a portion of said motorbike, the bike being connected in direct drive arrangement;

FIG. 4 is a plan view of the engine mount of the bike;

FIG. 5 is an end elevation view of said mount;

FIG. 6 is a side elevation view of said mount;

FIG. 7 is a perspective view of said mount;

FIG. 8 is a perspective view of the frame assembly of the bike; and

Figure 9:
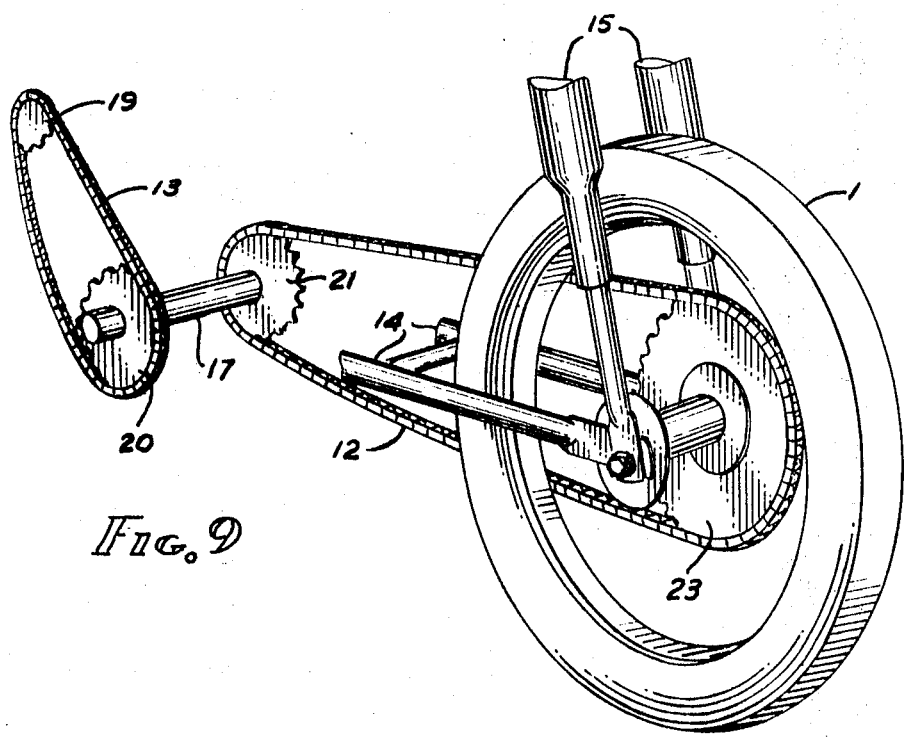
FIG. 9 is a perspective view of a portion of the bike, the bike being connected in jackshaft drive arrangement.

Referring now to the drawings, there is shown a motorbike having a driving wheel 1 driven by an internal combustion engine 2 of the conventional industrial type through chain-and-sprocket means described hereinafter. A steering wheel 3 is mounted to a front fork 4 which passes through a front fork bearing 73 on a bike frame 7 and ends in handlebar handles 5. A seat 6 is connected to the bike frame 7, as is a fuel tank 8, a headlight 9, and a taillight 10. An exhaust tailpipe 11 is connected to the engine to carry the exhaust therefrom to the rear of the motorbike as shown.

The bike frame 7, as best shown in FIG. 8, includes left and right underpieces 71, 72 of generally U-shape extending rearwardly from front fork bearing 73 downwardly, then horizontally along the central portion, and then upwardly to the upper part of the frame near the rear thereof, connecting with spaced-apart upper pieces 75, 76 near the rear brace member 78 mounted across pieces 75, 76 and near the perforated plates 79. Connecting the pieces 75, 76 to the front fork bearing 73 is a horizontal bar 74. To the rear of bar 74 another brace 77 is mounted across pieces 75, 76.

The engine 2 is mounted midway between the sides of the bike frame on an engine mount 16 having a mounting platform 161 inclined from horizontal as shown so as to hold the engine in the tilted position shown.

The platform 161 is inclined at about twenty degrees from horizontal, and the bottom base of the engine 2 is mounted thereagainst so that the engine is tilted forwardly about twenty degrees from the position it would have in a conventional mounting arrangement. This inclined mount feature thus positions the top of the engine lower than it would be conventionally and thereby enables the upper part of the frame to be lower than it would be conventionally, which results in a lower overall bike frame construction and silhouette.

The engine 2 is connected drivingly to the driving wheel 1 through a chain-and-sprocket drive arrangement which selectively may be either a jackshaft drive arrangement or a direct drive arrangement.

The jackshaft drive arrangement, as illustrated in FIGS. 1 and 9, includes a jackshaft 17 journaled in mount 16 and extending horizontally across the bike, a rear chain 12 connecting a drive wheel sprocket 23 on the right side of the drive wheel 1 to a jackshaft sprocket 21 on the right side of a jackshaft 17, and a front chain 13 connecting a jackshaft sprocket 20 on the left side of the jackshaft to an engine sprocket 19 on the left side of engine 2.

The direct drive arrangement, shown in FIG. 3, which may alternatively be used, includes a chain 18 directly connecting the engine sprocket 19 to a drive wheel sprocket 22 on the left side of drive wheel 1.

A pair of rear spring shock absorbers 15 are connected between the driving wheel axle and the upper rear part of the bike frame, being connected to the latter at the perforated plates 79 as best understood from FIGS. 1 and 8.

A swing arm H-frame 14 is connected between the driving wheel axle and the engine mount 16 on the bike frame, as best understood from FIGS. 1, 2, 3 and 9, with FIGS. 1, 2 and 9 showing it as used in the jackshaft drive arrangement with FIG. 3 showing it as used in the direct drive arrangement. This swing arm H-frame 14 is reversible side-for-side, used one way for the jackshaft drive and flipped over to and used in the reverse way for the direct drive. Also, the front ends of this H-frame connect to mount 16 at a different location for each of the two different drive arrangements, jackshaft and direct as is shown in the drawings and described in detail hereinafter. The purpose of the swing arm H-frame is to provide a shock absorbing rear suspension assembly. The front of the H-frame is pivotably mounted in the engine mount, swinging thereabout to accommodate changes in the roadway as the driving wheel engages the roadway, permitting vertical arcuate movement of the driving wheel against the cushioning resistance provided by the shock absorbers.

The engine mount 16 is connected, preferably by welding, to the bike frame in the bight of the U-shaped formed by the under pieces 71, 72 of the frame, and the mount is positioned with the top piece or platform 161 thereof inclined with its forward and lower than its rearward end.

Extending generally horizontally rearwardly from the rear of platform 161 is a rear skirt 169, and extending generally vertically downwardly and slightly forwardly from the front of platform 161 is a front skirt 168, the purpose of these skirts is to provide strength for the engine mount structure.

A pair of vertical side walls 162 depend from the side edges of platform 161, the side walls 162 being generally triangular in shape which conveniently permits connecting the mount to the frame as shown.

The platform 161 has therein four mounting slots 163, each extending in the forward-rearward direction, for mounting engine 2 on platform 161 midway between the sides thereof for adjusting the position of the engine thereon forwardly and rearwardly.

The platform 161 has a chain opening 165 therein, of generally rectangular shape, located near one side thereof and intermediate the forward and rearward ends thereof. The opening 165 threadingly receives the lower segment of chain 18 therethrough when the bike utilizes the direct chain drive, as indicated in FIG. 3 where the direct chain drive arrangement is shown. The opening 165 receives therethrough both the upper and lower segments of chain 13 when the bike utilizes the jackshaft drive arrangement, as indicated in FIGS. 1 and 9 where the jackshaft drive arrangement is shown.

The side walls 162 each have therein a circular opening 164, the openings 164 being in alignment horizontally across the mount and providing a bearing support journal for the jackshaft 17 when the jackshaft drive arrangement is utilized.

The side walls 162 each have therein a slot 167 located rearwardly of opening 164 and extending in the forward-rearward direction, the slots 167 being in alignment horizontally across the mount and providing for forward-rearward adjustment mounting of the front ends of the swing arm H-frame 14 to the engine mount when the motorbike utilizes the jackshaft drive arrangement. FIGS. 1 and 2 show the H-frame so mounted.

The side walls 162 each have a hole 166 therein disposed rearwardly and above slot 167, the holes 166 being in horizontal alignment across the mount 16 and providing for mounting the front ends of the swing arm H-frame 14 when the bike utilizes the direct chain drive arrangement, as shown in FIG. 3.

Adjustability of drive components is provided in several ways in the one-piece engine mount 16. Slots 163 in platform 161 provide adjustability in positioning the engine thereon for proper alignment and for chain adjustment. When the direct drive is used, as illustrated in FIG. 3 it will be understood that such alignment and the chain adjustment for chain 18 is provided by slots 163 in platform 161. When the jackshaft drive is used, then the adjustment for front chain 13 is provided by slots 163 in platform 161, but the adjustment for rear chain 12 is provided by the slots 167 in the side walls 162 by adjustably positioning the swing arm H-frame 14 in the slots 167, as can be appreciated from FIGS. 1, 2 and 9, to adjust for rear chain 12.

As can be understood from FIGS. 1, 2 and 9, with the jackshaft drive arrangement, the chain opening 165 in platform 161 of engine mount 16 receives both the upper and lower segments of chain 13, and the jack-shaft sprockets 20, 21 are positioned under platform 161 and between the side walls 162, and all of chain 12 is under platform 161 and the rear fender of the bike.

When the direct drive arrangement is used, the lower segment of the chain 18 threads through opening 165 in platform 161, as indicated in FIG. 3.

While the invention has been described in connection with a particular embodiment thereof, it will be understood that many changes and modifications may be made by those skilled in the art without departing from the invention. Accordingly, by the appended claims, it is intended to cover not only this particular embodiment but also all such changes and modifications as come within the true spirit and scope of the invention.

I claim:

1. A motorbike comprising: a bike frame; an engine; a driving wheel connectable to said engine through chain-and-sprocket means; an engine mount connected to said frame; said mount comprising a platform and a pair of side walls, one depending from each side edge of said platform; said mount having a chain opening along one side of said platform for passing a chain therethrough, a slot on said platform for rearward-forward adjustment of said engine thereon and a pair of jackshaft openings in said side walls providing a journal for a jackshaft, and said mount supporting said engine in a position tilted forwardly from vertical.

2. The invention of claim 1 wherein said mount has additional slots in said side walls and rearwardly of said jackshaft openings for forward-rearward adjustment of a swing arm H-frame extending to said mount from the axle of the driving wheel when said chain-and-sprocket means is a jackshaft arrangement.

3. The invention of claim 2 wherein said mount has holes in said side walls and above said additional slots for connecting said H-frame thereto when said chain-and-sprocket means is a direct drive arrangement.

4. The invention of claim 3 wherein said mount is a one-piece structure.

5. An engine mount for mounting an engine on a motorbike having a driving wheel connectable to the engine through chain-and-sprocket means and adapted to be driven thereby either in a direct drive, an arrangement including a direct chain from the engine sprocket to a driving wheel sprocket, or in a jackshaft arrangement drive including an engine-to-jackshaft chain from the engine sprocket to a first jackshaft sprocket and a jackshaft-to-driving wheel chain from a second jackshaft sprocket to a driving wheel sprocket, said mount comprising: a platform inclined with its front end lower than its rear end and having at least one engine mounting slot therein for mounting the engine thereon adjustably in forward-rearward direction; a pair of side walls, one depending from each side edge of said platform; each of said side walls having a circular opening therein in alignment horizontally across the mount for journaling a jackshaft when said jackshaft arrangement is used; each of said side walls having a slot therein in alignment horizontally across said mount for adjustably connecting the front ends of a swing arm H-frame to the mount when said jackshaft arrangement is used; each of said side walls having a hole therein in alignment horizontally across the mount for connecting the front ends of said H-frame to the mount when said direct drive arrangement is used.

6. The invention of claim 5 wherein the mount is a one piece structure.

7. The invention of claim 5 wherein said platform has a chain opening therein near one side thereof for threadingly receiving the lower segment of the direct chain when said direct drive arrangement is used and for receiving both the upper and lower segments of the engine-to-jackshaft chain when said jackshaft drive arrangement is used.

8. The invention of claim 7 wherein there are a plurality of engine mounting slots in said platform.

9. A motorbike having the engine mount defined in claim 8 wherein said mount is connected to the bike frame with said platform inclined from the horizontal with its front end lower than its rear end.

10. The invention of claim 9 wherein the inclination from horizontal is about twenty degrees, and wherein said mount is a one piece structure.

References Cited

UNITED STATES PATENTS

| | | | |
|---|---|---|---|
| 2,263,081 | 11/1941 | Fulton | 180—11 |
| 2,488,613 | 11/1949 | Woolsey et al. | 180—33 |

BENJAMIN HERSH, Primary Examiner

R. R. SONG, Assistant Examiner